United States Patent [19]
Fitch

[11] 3,863,709
[45] Feb. 4, 1975

[54] METHOD OF RECOVERING GEOTHERMAL ENERGY

[75] Inventor: John L. Fitch, Dallas, Tex.

[73] Assignee: Mobil Oil Corporation, New York, N.Y.

[22] Filed: Dec. 20, 1973

[21] Appl. No.: 426,851

[52] U.S. Cl. .................. 165/1, 165/45, 166/271
[51] Int. Cl. .................. F24j 3/02, F28d 21/00
[58] Field of Search .......... 166/271, 272, 259, 308, 166/307, 250, 50, 52, 57, 302; 165/45, 1

[56] References Cited
UNITED STATES PATENTS

| | | | |
|---|---|---|---|
| 3,223,158 | 12/1965 | Baker | 166/259 |
| 3,274,769 | 9/1966 | Reynolds | 165/45 X |
| 3,470,943 | 10/1969 | Van Huisen | 165/45 |
| 3,500,913 | 3/1970 | Nordgren et al. | 166/271 X |
| 3,501,201 | 3/1970 | Closmann et al. | 166/271 X |
| 3,537,529 | 11/1970 | Timmerman | 166/271 |
| 3,682,246 | 8/1972 | Closmann | 166/271 |
| 3,810,510 | 5/1974 | Fitch et al. | 166/271 |

*Primary Examiner*—Stephen J. Novosad
*Attorney, Agent, or Firm*—Henry L. Ehrlich; Charles A. Huggett

[57] ABSTRACT

This specification discloses a method and system for recovering geothermal energy from a subterranean geothermal formation having a preferred vertical fracture orientation. At least two deviated wells are provided which extend into the geothermal formation in a direction transversely of the preferred vertical fracture orientation and a plurality of vertical fractures are hydraulically formed to intersect the deviated wells. A fluid is injected via one well into the fractures to absorb heat from the geothermal formation and the heated fluid is recovered from the formation via another well.

9 Claims, 4 Drawing Figures

PATENTED FEB 4 1975

METHOD OF RECOVERING GEOTHERMAL ENERGY

BACKGROUND OF THE INVENTION

This invention is directed to the recovery of geothermal energy from a subterranean geothermal formation.

The temperature of the earth generally increases with depth. The geothermal gradient has been found to be variable from one location to another but in some locations has frequently been found to be on the order of 1° F. above atmospheric temperature for each 50 feet of depth. In other locations the geothermal gradient is much greater and subterranean formations are very hot. These areas have been generally referred to as geothermal resource areas.

Geothermal energy has been recognized as a source of heat energy which can be used for production purposes. For example, wells have been drilled into hot porous aqueouscontaining formations and geothermal steam produced therefrom and the steam used to generate electricity. However, only a few areas have been found from which such geothermal steam can be produced. Other potential geothermal resource areas contain hot water which may be produced and the heat energy extracted therefrom. These hot waters generally contain impurities such as corrosive salts which make the production and use of the hot water difficult and expensive.

In U.S. Pat. No. 3,580,330 there is described a method and installation for exploiting geothermal heat wherein hot geothermal water in liquid or vapor form is produced via a well from a geothermal body of water and passed through a heat exchanger and the heat from the water utilized for urban heating. Subsequently, the cooled water is reinjected through another well into the original geothermal body of water at a point sufficiently remote from the point at which it was extracted to prevent the cooled water from substantially lowering the temperature of the extracted water while ensuring a substantially steady hydrostatic pressure in the body of water.

In U.S. Pat. No. 3,470,943 there is described a system for the recovery and utilization of geothermal energy without necessarily removing geothermal steam or geothermal fluid from subsurface zones. A well extends into a geothermal subsurface zone and a heat exchanger is disposed in the well and at least partially submerged within the geothermal zone. A liquid is delivered to the heat exchanger and the heated liquid or vapor is conveyed to the surface where the energy in the liquid or vapor may be utilized for such things as driving engines and turbines, and heat irrigation of cultivated soil.

SUMMARY OF THE INVENTION

This invention is directed to recovering geothermal energy from a low permeability subterranean geothermal formation having a preferred vertical fracture orientation. A first and a second well are provided to extend from the surface of the earth and penetrate the geothermal formation at an angle of at least 10° measured from the vertical and extend into the formation in a direction transversely of the preferred vertical fracture orientation. A plurality of vertical fractures are hydraulically formed that are spaced laterally one from the other a predetermined distance measured in a direction approximately normal to the preferred vertical fracture orientation, which fractures intersect the wells. A fluid is injected via one well and into the vertical fractures and flowed through the fractures to the other well to absorb geothermal energy from the formation and heat the fluid. The heated fluid is produced to the earth's surface via the other well. Another embodiment is directed to recovering geothermal energy from a permeable geothermal formation. In accordance with this embodiment adjacent vertical fractures communicate with only one of the first and second wells and one vertical fracture communicates with the first well and the adjacent fracture communicates with the second well. A fluid is injected via the first well and into a vertical fracture and flowed through the formation to absorb geothermal energy and heat the fluid and the heated fluid is flowed into an adjacent fracture and produced to the earth's surface via the second well.

DESCRIPTION OF THE PREFERRED EMBODIMENTS

This invention is directed to a method of recovering geothermal energy from a geothermal subterranean formation. More particularly, this invention is directed to a method of recovering geothermal energy from a geothermal subterranean formation that has a preferred vertical fracture orientation and that does not contain sufficient mobile fluids therein which may be produced from the formation to recover large amounts of the geothermal energy therefrom.

Subterranean formations normally have a preferred fracture orientation which results from the state of stress within the formation. When sufficient hydrostatic pressure is applied to these formations to create fractures therein the fractures are normally created and propagated along the preferred fracture orientation. The preferred fracture orientation may vary from horizontal to vertical, but normally when the subterranean formation is located at depths greater than about 2,000 to 3,000 feet, the preferred fracture orientation is vertically disposed and the fractures which may be formed and propagated into the formation by hydraulic fracturing techniques are vertically disposed fractures and are referred to as "vertical fractures."

Various methods have been recognized for determining the preferred fracture orientation. It has been observed that subterranean formations are jointed in a manner similar to surface rock. Therefore, surface measurements may be employed as a reasonably close indication of the preferred fracture orientation. The preferred fracture orientation may also be determined from measurements taken in wells penetrating the subterranean earth formations of interest. For example, impression packer surveys may be run throughout the area to determine the fracture orientation. Borehole televiewer surveys offer a particularly good method for determining the preferred fracture trends. Borehole televiewer surveys are discussed in an article by J. Zemanek et al., entitled "The Borehole Televiewer — A New Logging Concept for Fracture Location and Other Types of Borehole Inspection," JOURNAL OF PETROLEUM TECHNOLOGY, Vol. XXI (June 1969), pp. 762–774.

Figure 1:
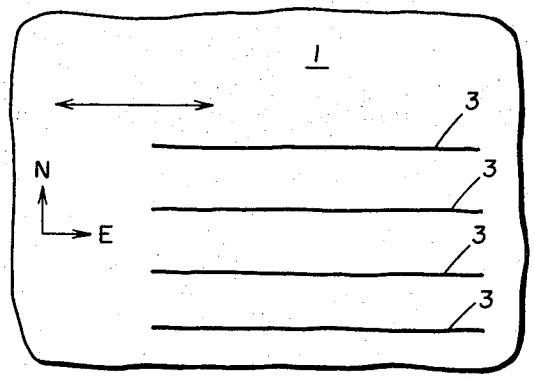
FIG. 1 is a plan view illustrating a subterranean geothermal formation having a preferred vertical fracture orientation in an east-west direction.

Referring to FIG. 1 there is shown a plan view of a subterranean geothermal formation 1 that has a preferred fracture orientation essentially in an east-west direction, as indicated by the plurality of fractures 3. These fractures 3 are shown for illustrative purposes and may be, for example, fractures naturally existing in the subterranean formation 1, fractures which have been induced in the subterranean formation 1, or may represent planes normal to the smallest principal stress component along the preferred fracture orientation.

In accordance with this invention, at least a pair of deviated wells is provided which extend from the earth and penetrate into subterranean geothermal formation in a direction transversely of the preferred fracture orientation. A plurality of vertical fractures that are spaced laterally one from the other are hydraulically formed and propagated into the subterranean geothermal formation from at least one well such that fractures intersect the other well.

Figure 2:
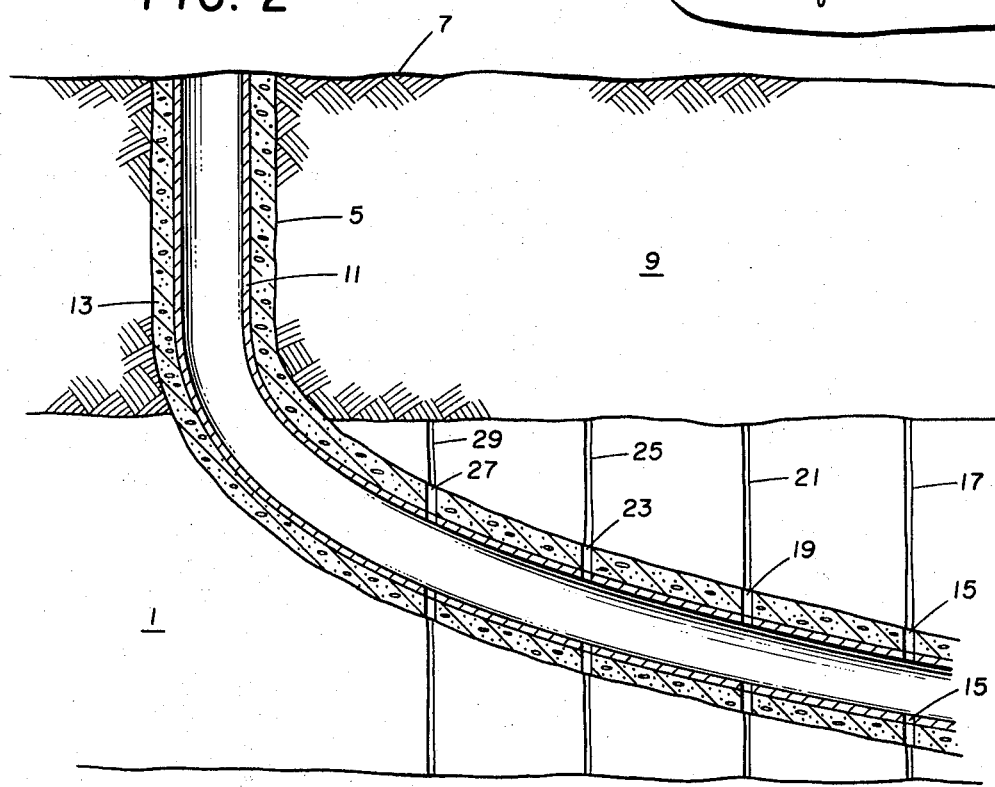
FIG. 2 is a cross-sectional view illustrating a deviated well penetrating a geothermal formation and illustrating vertical fractures that are spaced laterally one from the other a predetermined distance.

A method of forming from a deviated well a plurality of vertically disposed fractures that are spaced horizontally one from the other is described with reference to FIG. 2. In FIG. 2 there is shown a well 5 extending from the surface of the earth 7 through an overburden 9 and into the subterranean geothermal formation 1 having a preferred vertical fracture orientation. A casing 11 surrounded by cement sheath 13 is shown within well 5. The well 5, as shown, has casing therein but could be completed as an open hole. The well 5 is deviated at least in the lower portion thereof such that it penetrates the subterranean formation 1 at an angle of at least 10° measured from the vertical and in an azimuth direction transversely to the preferred vertical fracture orientation. The preferred vertical fracture orientation of formation 1 is taken for illustrative purposes to be in an east-west direction. Therefore, the well 5 is provided to extend into the subterranean geothermal formation in a direction transversely to the east-west preferred fracture orientation. Desirably, the well 5 would penetrate the formation 1 in a direction approximately normal to the preferred fracture orientation and thus in the case of the east-west preferred fracture orientation, the azimuth direction of the deviated portion of the well 5 penetrating the subterranean geothermal formation 1 is either north or south. A first fracture initiation point is formed in the well to provide fluid communication intermediate the well and the formation. In an open-hole completion, the fracture initiation point may be provided by a straddle packer technique wherein two packers (not shown) are used to straddle the selected fracture initiation point and wherein a tubing (not shown) extends from an upper region of the well and communicates with the fracture initiation point defined by the portion of the well intermediate these straddle packers such that hydraulic pressure may be applied to the fracture initiation point to create a vertically disposed fracture in the formation. In a cased well the first and other fracture initiation points may be provided by forming openings in the casing. Most wells are completed as cased wells and thus this method is described with reference to a cased well wherein the fracture initiation point corresponds with an opening provided in the casing. A first opening 15 (first fracture initiation point) is provided through the casing 11 and cement sheath 13 such that fluid communication is established between the interior of well 5 and the subterranean formation 1. The first opening 15 may be provided, for example, by perforating the casing, forming a slot therein, or other conventional techniques for opening fluid communication between the interior of the well and the subterranean formation. Thereafter, hydraulic pressure is applied via the well 5 and the first opening 15 to form a first vertical fracture 17 which communicates with the subterranean formation and the interior of the well 5 and to propagate the fracture into the subterranean formation 1. Thereafter, a second opening 19 is provided in the casing 11 and the cement sheath 13 at a predetermined, horizontal distance from the first opening 15. The first opening 15 and second opening 19 are isolated from fluid communication one from the other, for example, by placing a packer intermediate the first opening 15 and the second opening 19, or by filling the portion of the well intermediate the first and second openings with sand or other sealing material. Thereafter, hydraulic pressure is applied via the well 5 to form and propagate second verticle fracture 21 into the subterranean formation 1 in the direction of the preferred fracture orientation. Thereafter, these steps may be repeated to form other desired vertical fractures in the subterranean formation. For example, other openings 23 and 27 and corresponding vertical fractures 25 and 29 are shown for illustrative purposes. The formed vertical fractures extend into the geothermal formation 1 in the direction of the preferred vertical fracture orientation and thus are essentially parallel one with the other. The fractures may be propped to provide fracture conductivity. A tracer material such as radioactive tagged sand may be injected into the fractures to facilitate locating the intersection of the fractures with the other well or wells which penetrate the formation. The fractures may also be acidized, or acid fracturing techniques may be employed, to provide fracture conductivity.

The openings 15, 19, 23, and 27 are provided in the casing 11 at a predetermined and substantial distance one from the other to provide laterally spaced vertical fractures in the geothermal formation having a spacing essentially the same as the predetermined distance. The most desirable spacing of the fractures will depend upon such things as the temperature and permeability of the geothermal formation, the time period desirable to absorb heat from the formation as well as the thickness of the formation and the angle at which the wells transverse the formation. Generally, for a permeable formation, the spacing of the fractures should be at least 10 feet, and for a very low permeable formation the spacing should be at least 20 feet.

Figure 3:
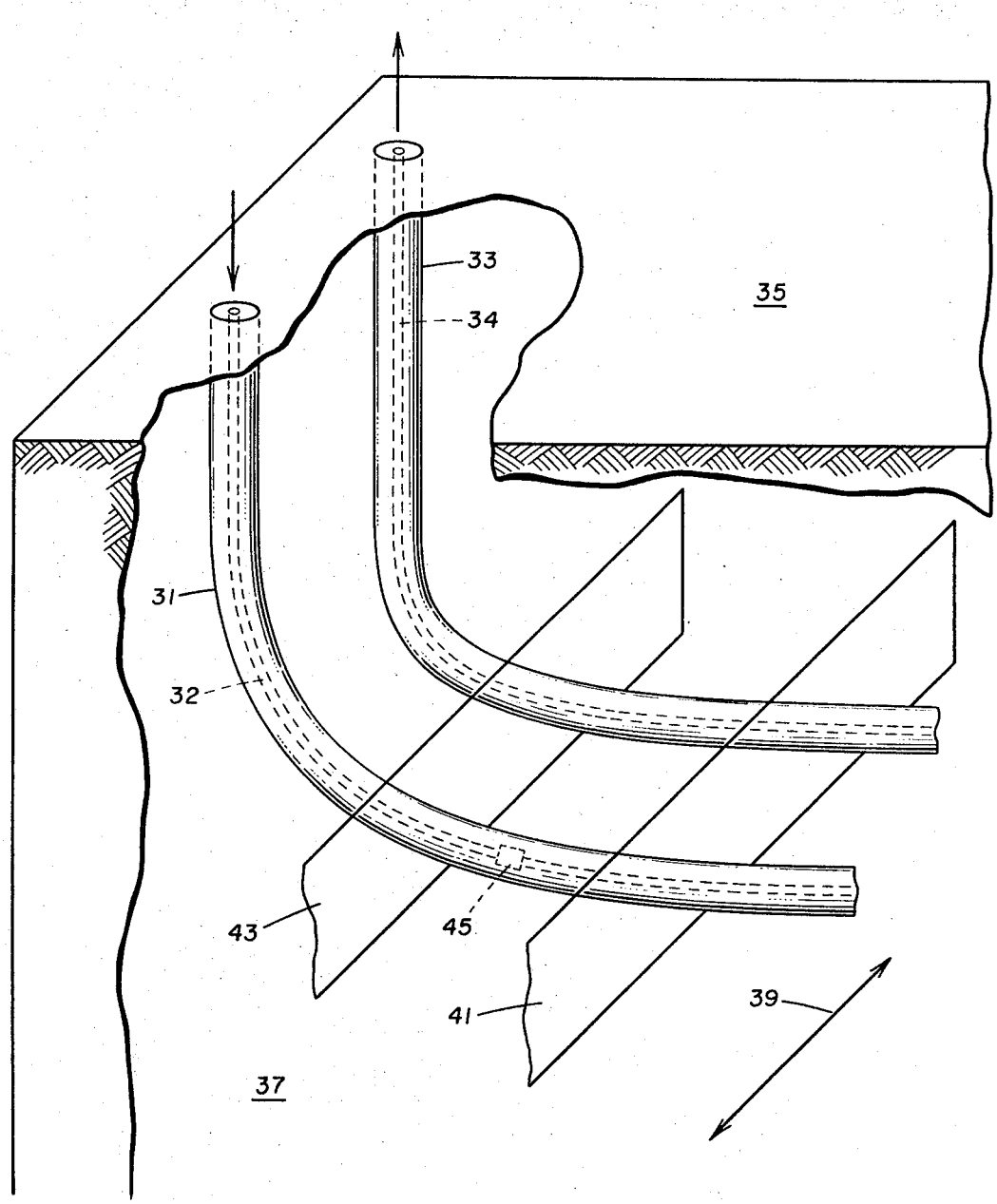
FIG. 3 is a perspective view illustrating this invention.

Referring to FIG. 3 there is shown a schematic view further illustrating this invention. An injection well 31 and a production well 33 are shown extending from the surface of the earth 35 and into a hot subterranean geothermal formation 37 having a preferred vertical fracture orientation 39. A vertical fracture 41 and another vertical fracture 43 are shown in the geothermal formation 37 communicating with the injection well 31 and production well 33. A tubing 32 having a flow regulator 45 located intermediate fractures 41 and 43 is shown in well 31 and a tubing 34 is shown in well 33. The flow regulator 45 serves to regulate the amount of fluid that may be injected from the well 31 into the vertical fractures that communicate with the well 31. Various means may be used to regulate the amount of fluid that is injected into the vertical fractures. A particular flow regulator that is applicable for use in accordance with this invention is the Baker Model "BF" Full-Opening Downhole Flow Regulator. A description of this and other regulators and their use in secondary oil field recovery systems is found on pages 482–488, Volume 1, of the 1972–1973 WORLD OIL COMPOSITE CATALOG OF OIL FIELD EQUIPMENT & SERVICES.

In accordance with an embodiment of this invention for recovering geothermal energy from a geothermal reservoir having very low permeability and containing insufficient mobile fluids to transport large amounts of geothermal energy, a fluid is injected down well 31 via tubing 32 and into the vertical fractures 41 and 43. Preferably, a flow regulator 45 is employed intermediate adjacent vertical fractures as illustrated in tubing 32 to regulate the amount of fluid that is injected into the fractures. It is normally desirable to flow approximately equal amounts of fluid into such fractures. The fluid is flowed via the fractures 41 and 43 through the geothermal formation 37 to the production well 33. The fluid, in flowing through the vertical fractures, absorbs heat from the geothermal formation and thus is heated. The heated fluid is produced via tubing 34 and well 33 to the surface where it may be employed, for example, in generating electricity. It is preferred that the fluid that is injected into the vertical fractures be a liquid because liquids have more capacity than gases for absorbing heat and thus more efficiently absorb heat from the geothermal reservoir. A preferred liquid is water because water is normally readily available at reasonable costs.

Figure 4:
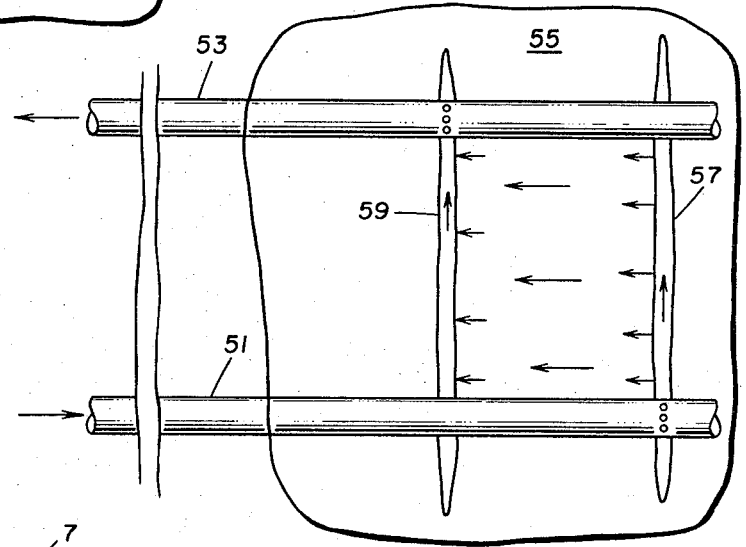
FIG. 4 is a schematic plan view illustrating another embodiment of this invention.

Another embodiment of this invention is directed to recovering geothermal energy from a geothermal reservoir that does not contain sufficient mobile fluid therein to produce very large amounts of the geothermal energy but that does contain sufficient permeability to permit fluids to flow through the reservoir. This embodiment is described by reference to FIG. 4 which is a schematic plan view showing an injection well 51 and a production well 53 penetrating a geothermal formation 55 which has been hydraulically fractured to provide at least a first vertical fracture 57 and a second vertical fracture 59. Communication is provided intermediate the first vertical fracture 57 and well 51 but no fluid communication is provided intermediate the second vertical fracture 59 and well 51. Communication is provided intermediate the second vertical fracture 59 and well 53 but no communication is provided intermediate the first vertical fracture 57 and the well 53. Communication may be provided intermediate a vertical fracture and a well by perforating the well at the location of the vertical fracture. The vertical fracture may be located behind casing by using radioactive tracer tagged proppant material when forming the vertical fracture and thereafter by logging a well which penetrates the vertical fracture with a radioactivity log. Perforations may then be provided at the location of the vertical fracture. If a well communicates with a vertical fracture and it is desired to close the communication, the well may be squeeze-cemented at the location of the fracture. Other means may also be used to close the communication. For example, a packer may be set to block the communications between the well and the vertical fracture. In accordance with this embodiment, a fluid, and preferably a liquid, and still more preferably an aqueous liquid, is injected via injection well 51 into the first vertical fracture 57. Injection of the fluid is continued and the fluid is driven from the first vertical fracture 57 through the permeable geothermal formation 55 and into the second vertical fracture 59. The fluid, in flowing through the geothermal formation, absorbs heat from the formation and is thus heated. The heated fluid is then produced from the second vertical fracture 59 via the production well 53 to the surface. In this embodiment, the spacing between the first vertical fracture 57 and the second vertical fracture 59 should be at least 10 feet. It is necessary in carrying out this invention that at least two vertical fractures be provided in the geothermal formation 55 intermediate the injection and production wells. More vertical fractures may be provided, however, and it is desirable that at least another vertical fracture be provided such that the first vertical fracture 57 into which the fluid is injected is sandwiched between two vertical fractures which serve as production fractures.

I claim:

1. A method of recovering geothermal energy from a low permeability subterranean geothermal formation having a preferred vertical fracture orientation, comprising the steps of:
   a. providing a first and a second well which extend from the surface of the earth and penetrate said geothermal formation at an angle of at least 10° measured from the vertical and extend into the formation in a direction transversely of said preferred vertical fracture orientation;
   b. hydraulically fracturing said formation to provide a plurality of vertical fractures which are spaced laterally one from the other a predetermined distance measured in a direction approximately normal to the preferred vertical fracture orientation and which fractures extend into the formation and intersect said first and said second wells;
   c. providing fluid communication intermediate each of said plurality of vertical fractures with each of said first and said second wells;
   d. injecting a fluid via one of said first and said second wells into said plurality of vertical fractures;
   e. flowing said fluid through said plurality of vertical fractures to heat said fluid; and
   f. producing said heated fluid from said plurality of vertical fractures via the other of said first and said second wells.

2. The method of claim 1 wherein said predetermined distance is at least 20 feet.

3. The method of claim 2 wherein a liquid is injected into said plurality of vertical fractures.

4. The method of claim 3 wherein said liquid is an aqueous liquid.

5. A method of recovering geothermal energy from a permeable subterranean geothermal formation having a preferred vertical fracture orientation, comprising the steps of:
   a. providing a first well and a second well which extend from the surface of the earth and penetrate said geothermal formation at an angle of at least 10° measured from the vertical and extend into said formation in a direction transversely of said preferred vertical fracture orientation;

b. hydraulically fracturing said formation to provide at least a first vertical fracture and a second vertical fracture which extend into said geothermal formation and intersect said first well and said second well, said fractures being spaced laterally one from the other a predetermined distance measured in a direction approximately normal to said preferred vertical fracture orientation and which fractures extend into the formation and intersect said first and said second wells;

c. providing fluid communication intermediate said first vertical fracture and said first well and providing no fluid communication intermediate said first vertical fracture and said second well;

d. providing fluid communication intermediate said second vertical fracture and said second well and providing no fluid communication intermediate said second vertical fracture and said first well;

e. injecting a fluid via said first well into said first vertical fracture and driving said fluid through said geothermal formation intermediate said first and said second vertical fractures and into said second vertical fracture; and f. producing said heated fluid via said second vertical fracture and said second well.

6. The method of claim 5 wherein said predetermined distance is at least 10 feet.

7. The method of claim 6 wherein said fluid is a liquid.

8. The method of claim 7 wherein said liquid is an aqueous liquid.

9. A system for producing geothermal energy from a low permeability subterranean geothermal formation having a preferred vertical fracture orientation, comprising the combination of:

a. a first deviated well and a second deviated well which extend from the surface of the earth and penetrate said geothermal formation in a direction transversely of said preferred fracture orientation;

b. a first vertical fracture and a second vertical fracture spaced laterally one from the other, said first and said second vertical fractures extending into said geothermal formation to intersect said first and said second wells and having fluid communication with said first and said second wells; and c. a means for regulating flow of fluid installed in said first well intermediate said first and said second vertical fractures.

* * * * *